United States Patent [19]

Determan

[11] 4,310,143

[45] Jan. 12, 1982

[54] ELECTRICALLY CONTROLLED PROPORTIONAL VALVE

[75] Inventor: Roger G. Determan, North Branch, Minn.

[73] Assignee: Gresen Manufacturing Company, Minneapolis, Minn.

[21] Appl. No.: 178,389

[22] Filed: Aug. 15, 1980

Related U.S. Application Data

[63] Continuation-in-part of Ser. No. 964,475, Nov. 29, 1978, abandoned.

[51] Int. Cl.³ .................. F15B 13/043; F15B 13/044; F16K 31/08

[52] U.S. Cl. ................................ 251/30; 137/625.64; 137/625.65; 251/65; 251/137; 251/141

[58] Field of Search ...................... 137/625.64, 625.65; 251/65, 129, 137, 139, 141, 30

[56] References Cited

U.S. PATENT DOCUMENTS

| | | | |
|---|---|---|---|
| 2,953,123 | 9/1960 | Reen et al. | 137/625.64 X |
| 3,178,151 | 4/1965 | Caldwell | 251/141 X |
| 3,502,105 | 3/1970 | Ernyei et al. | 251/65 X |
| 3,599,673 | 8/1971 | Lucien | 251/65 X |
| 3,814,376 | 6/1974 | Reinicke | 251/137 X |
| 3,835,888 | 9/1974 | Leutner | 137/625.64 X |
| 3,977,436 | 8/1976 | Larner | 251/129 X |
| 4,071,042 | 1/1978 | Lombard et al. | 251/65 X |

OTHER PUBLICATIONS

Ledex Catalog, SS-1104.

"Pressure Compensated Electro-Hydraulic Proportional Flow Control Valve" by Kishor Patel; Society of Automotive Engineers, Inc., Technical Services #780,747.

Moog, Inc. Industrial Division; Moog Series 60 Proportional Control Valves.

Moog Type A65 Proportional Electrohydraulic Directional Control Valve.

SLI Industries Catalog.

Koehring, Pegasus Division; Pegasus Servovalves.

Bertea Corporation, Electroproportional Valve.

*Primary Examiner*—Gerald A. Michalsky

*Attorney, Agent, or Firm*—Merchant, Gould, Smith, Edell, Welter & Schmidt

[57] ABSTRACT

The present invention is an electrically controlled valve (10) that includes an elongated valve body (38) with an axial passageway (48) disposed along the elongation axis (44) thereof. The valve body (38) has at least one inlet passageway (52) and at least one outlet passageway (56, 58) in fluid communication with the axial passageway (48). The valve (10) includes structure (60, 62) for establishing a static magnetic field within the valve body and axial passageway. The valve member (90) is mounted within the axial passageway (48) for reciprocation therein to selectively establish fluid communication between the inlet and outlet passageways of the valve body. The valve member (90) has at least a portion thereof formed of material that is magnetizable and of relatively low permeability. An electromagnetic device (78, 79) is mounted to the valve body for inducing a magnetic field within the magnetizable portion of the valve member such that the induced magnetic field interacts with the static magnetic field to position the valve member axially. Control apparatus is provided for regulating the energization of the electromagnetic device (78, 79) to thereby control the axial position of the valve member (90). The valve body is a substantially cylindrical member (38) with the axial passageway disposed along its central axis (44). The valve member (90) includes a spool portion (96) and first and second magnetizable end portions (92, 94) in one embodiment and in an alternative preferred embodiment valve member (10) is formed of magnetizable material along substantially its entire length. The electromagnetic device is, in the preferred embodiment, a coil (78, 79) which is mounted at each end of the cylindrical valve body (38) into which the first and second magnetizable portions (82, 94) of the valve member (90) extend. The control apparatus includes an electrical control circuit (172, 174) that regulates the magnitude and direction of direct current through the coil.

16 Claims, 13 Drawing Figures

FIG. 1
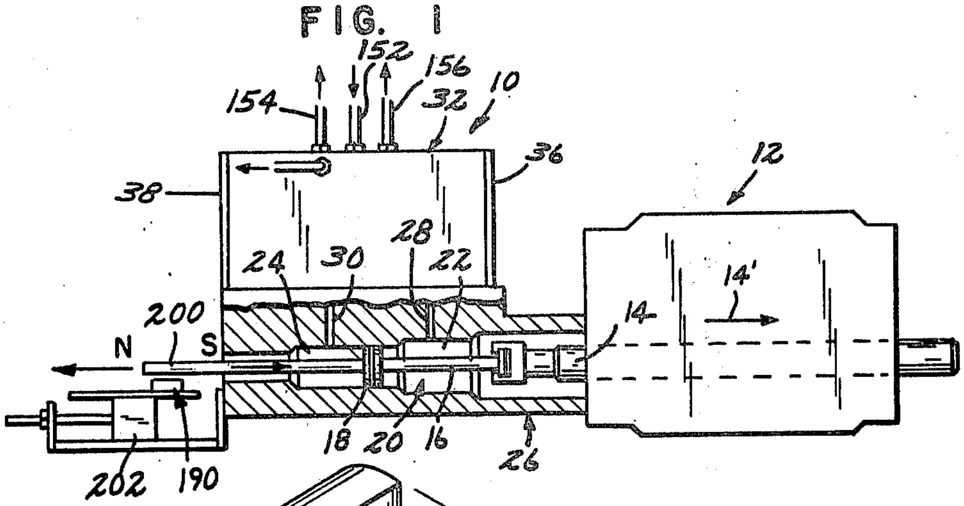
FIG. 3
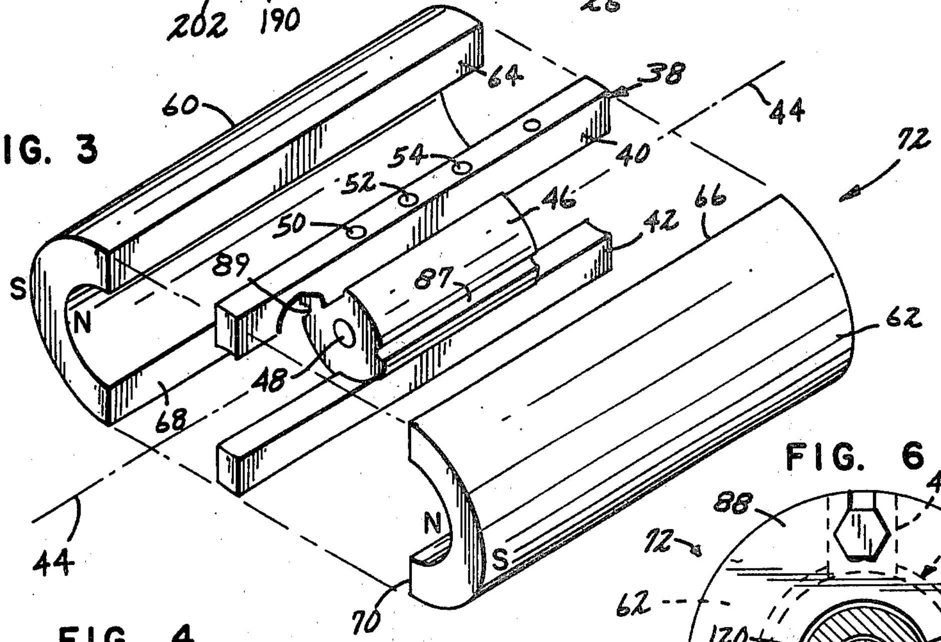
FIG. 4
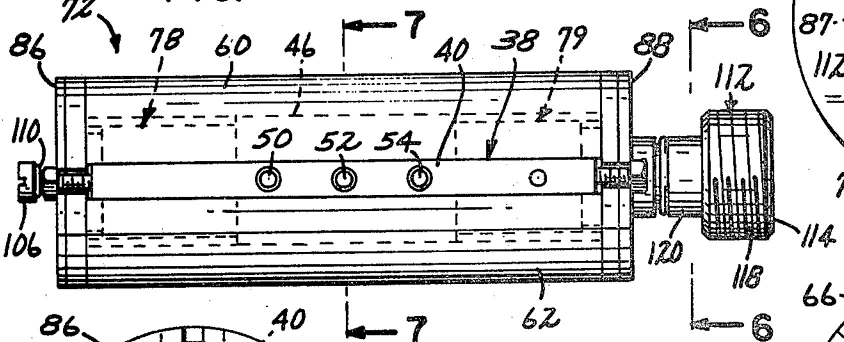
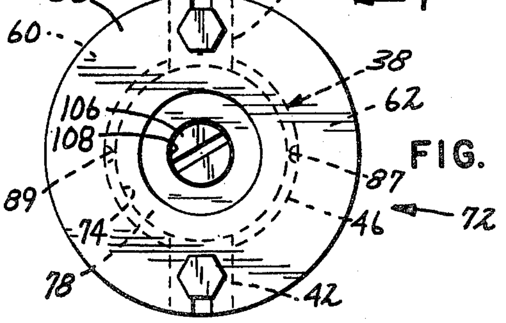
FIG. 5
FIG. 6
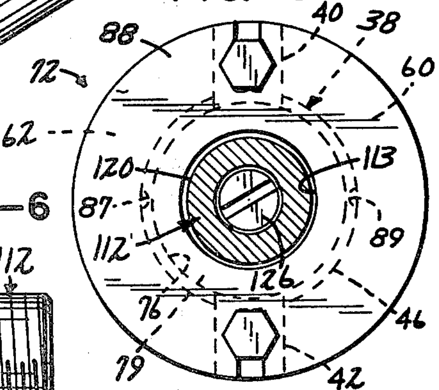
FIG. 7
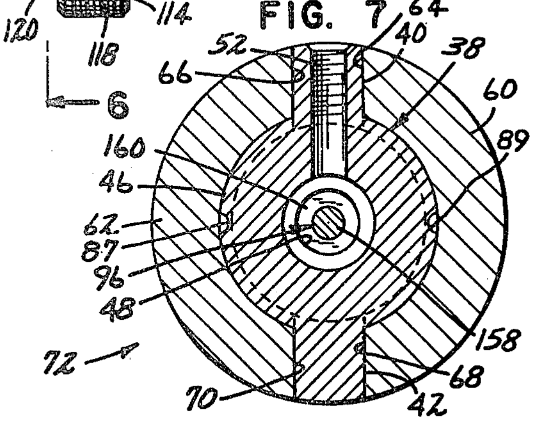

ELECTRICALLY CONTROLLED PROPORTIONAL VALVE

This application is a continuation-in-part of U.S. patent application, Ser. No. 964,475, filed Nov. 29, 1978, now abandoned.

BACKGROUND OF THE INVENTION

The present invention relates broadly to electrically actuated valves and, in particular, to a valve having specific application as a pilot or control valve in hydraulic systems.

Electrically actuated valves are well-known in the prior art. Such valves include those that have solenoid actuated valve members. Such valves have discrete open and closed positions corresponding to energization of a solenoid coil or deenergization of the coil. Such valves are therefore either completely open or completely closed dependent upon the flow of current into the solenoid coil. While such prior art solenoid operated valves are useful in many applications, it is desirable to have a valve that is electrically controlled such that the valve member can be accurately positioned in a plurality of positions to provide fluid communication between selected ones of a plurality of fluid passageways. Such valves have particular application as pilot valves in hydraulic systems, specifically systems on tractors and other heavy equipment. The present invention satisfies this requirement in that it is a valve with a valve member having movement in proportion to electrical current flow. The valve member can thus be accurately positioned in an infinite number of locations by varying the direction and/or magnitude of the controlling current flow. When used as a pilot valve the present invention has the advantage of having an electronic closed loop control network. This electronic control has significant advantage over the prior art in hydraulic systems that are often subject to operation in a harsh environment. When used as a multiposition valve independent of a pilot or control function, the present invention provides a relatively inexpensive and accurately controlled multiposition valve.

SUMMARY OF THE INVENTION

The present invention is an electrically controlled valve that includes a valve body having an elongation axis with an axial passageway therethrough aligned with the elongation axis. The valve body has at least one inlet passageway and at least one outlet passageway, each such passageway in fluid communication with the axial passageway of the valve body. Means are provided for establishing a biased magnetic field within the valve body and axial passageway. An elongated valve member is mounted for axial reciprocation within the axial passageway to selectively establish fluid communication between the inlet and outlet passageway. The valve member has a portion thereof which is magnetizable when placed in a magnetic field. Electromagnetic means are provided for magnetizing the valve member portion such that the magnetic field induced in the valve member portion interacts with the biased magnetic field to position the valve member within the axial passageway. Control means is included for regulating the energization of the electromagnetic means to thereby control the axial position of the valve member.

In the preferred embodiment, the valve body is substantially cylindrical and the means for establishing a biased magnetic field includes a pair of substantially semicylindrical magnetic members disposed about the valve body. The valve body has a plurality of fluid passageways extending radially outward and in fluid communication with the axial passageway. The valve member includes a spool portion, which establishes fluid communication between selected ones of the radially extending fluid passageways, and first and second magnetizable end portions. Conductive coils are mounted to opposite ends of the cylindrical valve body and the first and second magnetizable portions of the valve member extend into the conductive coils. Electric circuit means controls the energization of the coils to regulate the axial position of the valve member. The coils are connected in parallel and in phase and are energized with a DC current and the magnitude and direction of the current establishes the induced magnetic field within the first and second magnetizable end portions of the valve member. This controlled magnetic field interacts with the biased magnetic field to position the valve member in proportion to the current in the coils and the direction thereof.

The present invention has particular application as a pilot valve for controlling the position of a piston actuated hydraulic valve with a piston actuator mounted within a chamber divided into first and second portions by the reciprocating piston. The piston actuated valve has hydraulic fluid passageways communicating with outlet passageways of the pilot valve and with the first and second chamber portions. The pilot valve is electrically controlled as previously described to direct the hydraulic fluid into the piston chamber. Means are provided for generating a feedback signal to the pilot valve electrical control means. The feedback signal is indicative of the position of the piston actuated valve. In the preferred embodiment, the feedback signal is generated by a Hall effect generator which detects a magnetic field produced by permanent magnet means affixed to the position rod of the piston actuated hydraulic valve.

The present invention is therefore an electrically controlled valve having a valve member with its position controlled by the magnitude and direction of a DC current applied through an electromagnetic coil. The valve member is positionable along a reciprocal axis to provide fluid communication between selected fluid passageways therethrough. The valve of the present invention is particularly adaptable as a pilot valve in hydraulic control systems when heavy duty equipment, such as tractors, is exposed to harsh environment. These and other advantages of the present invention will become apparent with reference to the accompanying drawings, detailed description of the preferred embodiment and claims.

BRIEF DESCRIPTION OF THE DRAWINGS

FIG. 1 is a side elevation view with a portion thereof shown in section illustrating the application of present invention as a pilot valve controlling a conventional prior art hydraulic four-way valve;

FIG. 3 is an exploded view in perspective showing the valve body of the present invention with a portion thereof broken away;

FIG. 4 is a top plan view of the valve body of the present invention with the parts thereof shown in assembled relationship;

FIG. 5 is an end view of the assembled valve body illustrated in FIG. 4;

FIG. 6 is a sectional view taken generally along the line 6—6 of FIG. 4;

FIG. 7 is a sectional view taken generally along the line 7—7 of FIG. 4;

DETAILED DESCRIPTION OF THE PREFERRED EMBODIMENT

Figure 2:
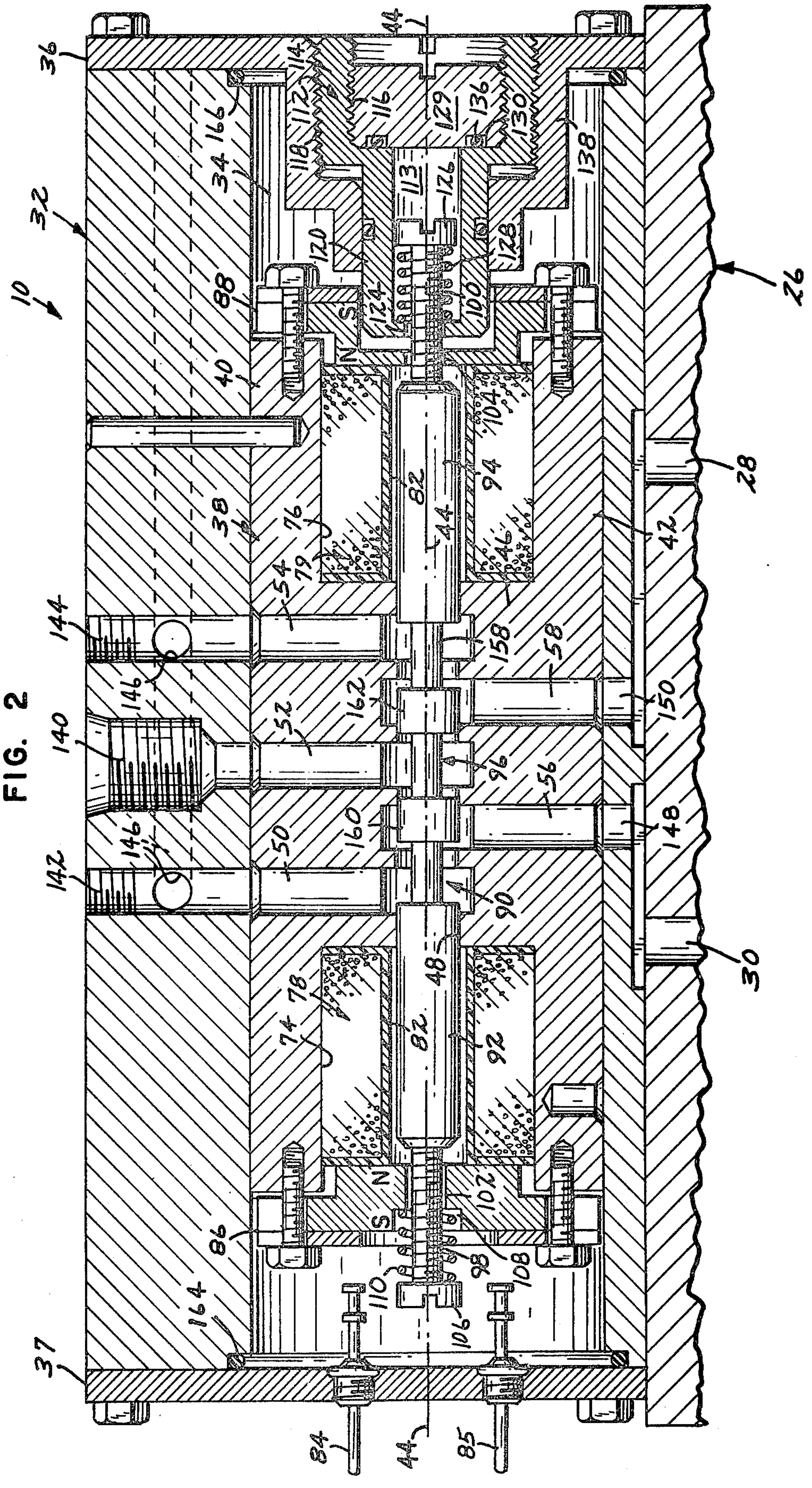
FIG. 2 is an enlarged sectional view of the valve of the present invention.

Referring to the drawings, wherein like numerals represent like parts throughout the several views, FIG. 1 illustrates the electrically controlled proportional valve or force motor of the present invention, designated generally at 10, when applied as a pilot valve controlling a conventional prior art four-way valve 12. For example, one such conventional prior art valve 12 is manufactured by Gresen Manufacturing Company of Minneapolis, Minn. Valve 12 is typically a valve in a hydraulic system to control various functions on heavy duty equipment and/or vehicles such as tractors, etc. Valve 12 includes a valve member 14 connected to a rod 16 to which is affixed a piston 18. Piston 18 is mounted for reciprocation within a hydraulic chamber 20 that includes a first chamber portion 22 and a second chamber portion 24. Chamber 20 is formed in a housing 26 in which is also provided a pair of fluid passageways 28 and 30 which provide fluid communication between proportional valve 10 and first and second chamber portions 22 and 24, respectively, as will be described in more detail hereafter. The introduction of hydraulic fluid into first chamber portion 22 or second chamber portion 24 combined with the exhaust of hydraulic fluid from the opposite chamber portion causes the reciprocal movement of piston 18 within chamber 20 thereby positioning valve member 14 of valve 12.

Proportional valve 10 is illustrated in more detail in the enlarged sectional view of FIG. 2. Valve 10 includes a housing 32 which defines a substantially cylindrical inner chamber 34. A pair of end covers 36 and 37 are secured to housing 32 by conventional threaded fastening means to substantially enclose chamber 34. Mounted within chamber 34 is a valve body 38 which is shown in more detail in the exploded perspective view of FIG. 3.

Valve body 38 includes first and second elongated members 40 and 42 which are substantially rectangular in cross-section and which have elongation axes parallel to each other and to what may be defined as the central axis of cylindrical chamber 34, such central axis being shown at 44. Valve body 38 further includes a cylindrical central member 46 having a central axial passageway 48 therethrough. Central axial passageway 48 is aligned along central axis 44 of chamber 34. Elongated members 40 and 42 are positioned diametrically opposed about the circumference of cylindrical member 46. A plurality of fluid passageways 50, 52, 54, 56, and 58 are provided within valve body 38. Passageways 50–58 extend radially outward from and are in fluid communication with central axial passageway 48. In the preferred embodiment disclosed herein, passageway 52 defines a fluid inlet while passageways 56 and 58 provide a fluid outlet. Passageways 50 and 54 are fluid exhaust passageways.

Disposed about and encompassing valve body 38 are a pair of symmetrical magnetic members 60 and 62. In the preferred embodiment member 60 and 62 are generally semicylindrical with planar end surfaces 64 and 66 and surfaces 68 and 70 which abut against members 40 and 42, respectively. Members 60 and 62 are magnetized such that a north pole is established at their inner radii while a south pole is established at their outer radii. Valve body 38 and megnetic members 60 and 62 form a cylindrical body designated generally as 72 which is received within inner chamber 34 of housing 32. Cylindrical body 72 has generally cylindrical chambers 74 and 76 defined at opposite ends thereof. Mounted within chambers 74 and 76 are first and second electromagnetic coils 78 and 79 which are connected in parallel and in phase with each other. Each coil includes a spool as at 82 about which is wound an electrical conductor. End cap 37 has a pair of electrical connectors 85 and 84 which extend into inner chamber 34 and through which the electrical conductors of coil 78 are attached. For the sake of clarity the electrical conductors and their connection to connectors 85 and 84 are not shown. Grooves 86 and 88 may be provided in cylindrical member 46 whereby the electrical conductor to coil 79 can be channeled from coil 78. Connectors 85 and 84 are themselves connected to suitable source of electrical power. End caps 86 and 88 are fastened by suitable means to elongated members 40 and 42 to substantially enclose chambers 74 and 76. End caps 86 and 88 may be permanent magnets having north and south poles oriented as shown in FIG. 2. End caps 86 and 88 in combination with magnetic members 60 and 62 thereby define a biased magnetic field within chambers 74 and 76 and valve body 38. For the purpose of description herein the biased magnetic field has a north pole oriented generally along central axis 44 and the south pole disposed radially with respect to said central axis. Valve body 38 is manufactured of nonmagnetic material.

Mounted within central axial passageway 48 is a valve member 90 that includes armature portions 92 and 94 at opposite ends thereof and a valve spool portion 96. Armature portions 92 and 94 are magnetizable and a magnetic bias is induced therein by electromagnetic coil portions 79 and 80. While in the preferred embodiment, portions 92 and 94 are disclosed as magnetizable, it is understood that it is within the spirit and scope of the present invention that any portion of valve member 90 or the entire member 90 may be formed of magnetizable material. When power is removed from coils 78 and 79, armature portions 92 and 94 may revert to a nonmagnetized state. Valve member 90 is mounted for axial reciprocation within passageway 48. As will be described in more detail hereafter, the axial position of valve member 90 is dependent upon the energization of coils 78 and 79 and therefore the current through the electrical conductor wrapped about spools 82 and 84.

Each end of valve member 90 has a screw member 98 and 100 which projects through apertures 102 and 104 in end caps 86 and 88, respectively, and which are threadedly received in portions 92 and 94. Screw member 98 has a head 106 and end cap 86 has a recess 108 therein. A spring 110 is disposed about portion 98 and engaged with head 106 and end cap 86 within recess 108. End cap 36 has a plug 112 mounted therein. Plug 112 includes an enlarged portion 114 with internal and external threads at 116 and 118, respectively. External threads 118 are threadingly engaged with mating threads on end cover 36. Plug 112 has a tubular portion 120 having an axial passageway at 113 which is aligned with central axial passageway 48. An aperture 124 is provided in tubular portion 120 aligned with aperture 104 in end cap 88. Screw member 100 of valve member 90 extends through apertures 104 and 124 into passageway 113. Portion 100 has a head 126. A spring 128 is disposed about portion 100 and in engagement with head 126 and with the inner surface of tubular portion 120 about aperture 124. Spring 110 and 128 serve to bias valve member 90 in a predetermined null position. Screw members 98 and 100 may be adjusted to control the predetermined null or unenergized position of valve member 90 axially within passageway 48. A plug member 129 is received in threaded engagement with internal threads at 116 on plus 112. Plug member 129 substantially encloses axial passageway 113. An annular recess 130 is disposed in the inner surface of plug member 129 and an O-ring seal 136 is received therein. End cover 36 has a generally tubular portion 138 that extends into chamber 34 and is aligned with central axis 44. Tubular portion 138 serves as a guide and mount for plug 112.

Housing 32 has a fluid inlet passageway 140 and a pair of fluid exhaust passageways 142 and 144. Passageway 140 is disposed in alignment with passageway 52 while passageways 142 and 144 are disposed in alignment with passageways 50 and 54, respectively. Fluid passageways 142 and 144 may also be in fluid communication with each other through passageway 146 formed in housing 32. Housing 32 is also provided with fluid outlet passageways at 148 and 150 which are aligned with passageways 56 and 58, respectively. Passageway 148 may be in fluid communication with passageway 30 of housing 26 while passageway 150 may be in fluid communication with passageway 28 in housing 26. A fluid inlet conduit 152 may be connected to passageway 140 while fluid return conduits 154 and 156 may be connected to passageways 142 and 144.

Spool portion 96 of valve member 90 includes a rod member 158 having a first diameter and which has a plurality of enlarged portions 160 and 162 which have a second diameter greater than the diameter of the rod 158. Enlarged portions 160 and 162 are axially spaced apart along central axis 44 within passageway 48. The axial position of spool member 96 and therefore enlarged portions 160 and 162, determine those axial passageways 50–58 that are placed in fluid communication with each other. Such valve action of member 90 is known in conventional spool-type valves. In the position shown in FIG. 2, for example, it can be seen that passageways 50 and 56 are in fluid communication with each other and passageways 54 and 58 are also in fluid communication with each other. Inner chamber 34 of housing 32 may be sealed by providing O-ring seals 164 and 166 at the connection of end covers 37 and 36 respectively, to housing 32.

Figure 8:
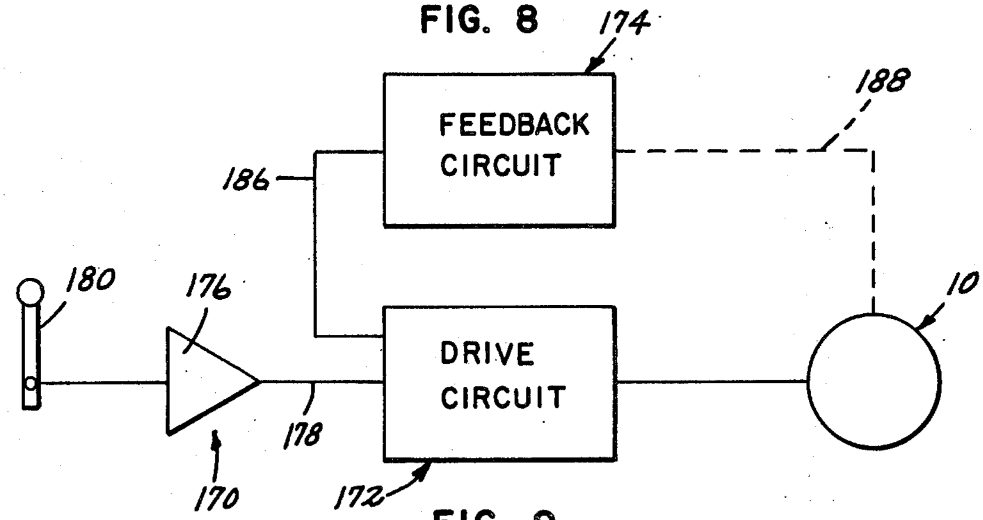
FIG. 8 is a schematic in block diagram form of the electrical control circuit of the present invention.
Figure 9:
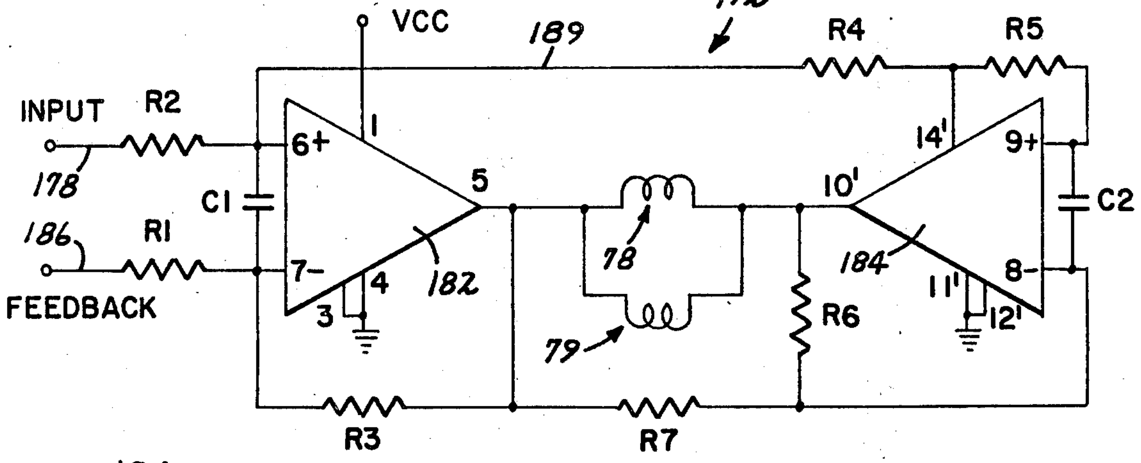
FIG. 9 is a detailed circuit diagram of the drive circuit of the electrical control circuit of the present invention.
Figure 10:
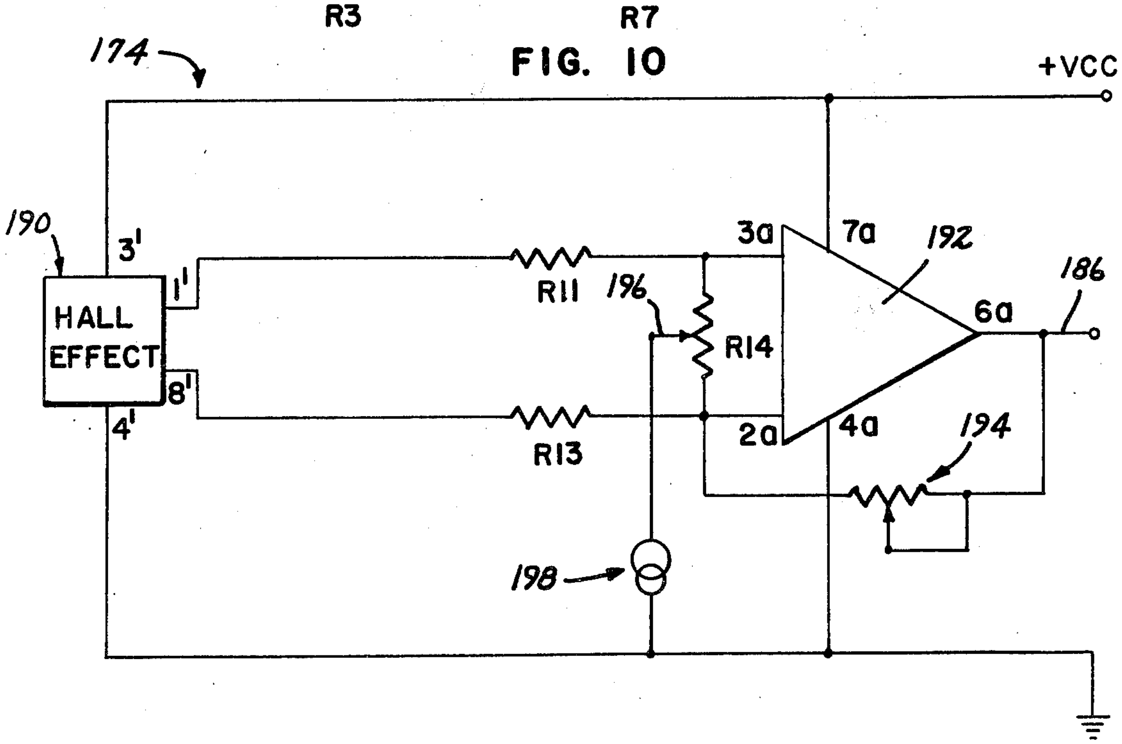
FIG. 10 is a detailed electrical circuit diagram of the feedback circuit of the electrical control of the present invention.

The electrical control of valve 10 is illustrated in FIGS. 8–10. The electrical control circuitry is illustrated diagrammatically in FIG. 8 and includes a manual control signal generator 170, a control valve or force motor drive circuit 172 and a feedback signal generating circuit 174. Generator circuit 170 includes an amplifier 176 that generates a signal on line 178 corresponding to manual operation of a manually operable control lever or other device 180. Drive circuit 172 includes a pair of amplifiers 182 and 184 connected in a bridge to power valve 10 as will be described in more detail with respect to FIG. 9. Feedback circuit 174 generates a signal corresponding to the position of valve 10 and the signal is applied on line 186 to drive circuit 172. In the preferred embodiment, the connection of feedback circuit 174 to valve 10 is magnetic and is illustrated by the dotted line at 188. It is understood that alternative feedback connections between valve 10 and circuit 174 may be provided within the spirit and scope of the present invention, for example, fiberoptic feedback control may be utilized.

Referring to FIG. 9, drive circuit 172 is shown in more detail. Power amplifier 182 has a positive input 6 and a negative input 7. Amplifier 184 has a positive input 9 and a negative input 8. Amplifiers 182 and 184 represent an appropriately wired integrated circuit which is commercially available. A convenient integrated circuit which can be purchased as an off-the-shelf item carries the designation LM 379S and is manufactured by National Semiconductor. It is understood that a discrete circuit configuration would also provide the required electrical control. Power amplifier 182 has a terminal 1 which is connected to a source of DC potential designated as VCC. Terminals 3 and 4 of amplifier 182 are connected to ground and an output terminal 5 is connected to coil 78 of proportional valve or force motor 10. Input line 178 is connected through a resistor $R^2$ to positive input 6 and feedback line 186 is connected through a resistor $R^1$ to negative input 7. A capacitor $C^1$ is connected between inputs 6 and 7 and functions as a stabilization capacitor. A line 188 connects input 6 through resistors $R^4$ and $R^5$ to positive input 9 of power amplifier 184. Terminal 14′ of amplifier 184 is connected to line 189 between resistors $R^4$ and $R^5$ to provide a bias for circuit 172. Resistors $R^4$ and $R^5$ may be selected such that substantially no signal is received at positive input 9 from line 178 through application of an input signal at 6 of amplifier 182. Terminals 11′ and 12′ of amplifier 184 are connected to ground and output terminal 10′ is connected to coil 78. Output terminal 5 of power amplifier 182 is connected through resistor $R^7$. Resistor $R^3$ is a high impedance feedback resistor and the value thereof is sufficiently high such that a feedback signal appearing on line 186 does not appear at resistor $R^7$. Resistor $R^6$ is connected between output terminal 10′ and negative input 8 of power amplifier 184. A capacitor $C^2$ which functions as a stabilization capacitor is connected across inputs 8 and 9 of amplifier 184.

FIG. 10 illustrates in more detail feedback circuit 174. Circuit 174 includes a Hall effect generator 190 having DC input terminals 3′ and 4′ and differential output terminal 1′ and 8′. Hall effect devices are well-known in prior art and operate upon the principle that the device will generate an electrical signal when it encounters a magnetic field. Hall effect devices are commercially available and any convenient such device may be selected and incorporated into feedback circuit 174. Input 3' is connected to a source of DC potential designated VCC. Input 4' is connected to ground. Output 1' is connected through resistor $R^{11}$ to a positive input terminal 3*a* of an integrator 192. Output 8' of Hall effect generator 190 is connected through a resistor $R^{13}$ to the negative input 2*a* of itegrator 192. A bias terminal 7*a* of integrator 192 is connected to the source of DC potential, i.e., VCC. Ground terminal 4*a* of integrator 192 is connected to ground. Also connected between output terminal 6*a* and negative input terminal 2*a* is a variable resistor 194 which may be adjusted to match the gain of amplifier 196. Connected between terminals 3*a* and 2*a* of integrator 192 is a resistor $R^{14}$. An offset tap 196 is connected from resistor $R^{14}$ through a constant current diode which is designated as 198 to ground. Offset tap 196 is variable and may be adjusted such that the output of integrator 192 matches the output of manual control amplifier 176 at a null state or unenergized state of valve 10. In one embodiment of the present invention, the null state potential appearing on lines 186 and 178 is selected to be 5 volts DC. Diod 198 maintains a constant current regardless of the bias voltage VCC thereby providing a constant reference for the offset potential at terminal 6*a* of integrator 192 and on line 178 of amplifier 176.

FIG. 1 illustrates the mounting of Hall effect device 190 when proportional valve 10 is utilized in conjunction with four-way valve 12. Piston rod 16 extends outward from housing 26 and is provided with a permanent magnet 200 on its external end. Hall effect generator 190 is mounted on a support 202 in close proximity to permanent magnet 200. Support 202 may be adjustably positioned to vary the location of generator 190. As rod 16 reciprocates within hydraulic chamber 20 the interaction of the permanent magnet 200 with Hall effect generator 190 produces a feedback signal on line 186. It will be understood that when proportional control valve 10 is utilized independently of four-way valve 12 that a feedback signal can still be generated utilizing the Hall effect principle. In this application, it is contemplated that, for example, chamber 34 could be enlarged and Hall effect generator 190 mounted at the end of valve member 90 which extends through end cap 86. Such modification is within the ordinary skill in the art and within the scope of the present invention.

The operation of the present invention will now be described with reference to valve 10 utilized in connection with four-way valve 12. Assume, for example, that it is desired to position four-way valve 12 in a position whereby valve member 14 must be moved to the right with reference to FIG. 1 in the direction of the arrow 14'. Hydraulic fluid, therefore, must be introduced into chamber portion 24 and exhausted from chamber portion 22. The manual control signal generator is activated to provide a signal on line 178 controlling the direction and amount of DC current through coils 78 and 79. The electrical control will be described in more detail hereafter, but for the present discussion, it is assumed that the proper amount of current in the proper direction is fed to coils 78 and 79. For the present discussion, it will be assumed that valve member 90 starts in a null position shown in FIG. 2. Valve member 90 must therefore be moved to the left as shown in FIG. 2 to establish fluid communication between inlet passageway 52 and outlet passageway 56 and also establish fluid communication between exhaust passageway 54 and outlet passageway 58. With the current in coils 78 and 79 flowing in one direction armature portions 92 and 94 are magnetized. Coils 78 and 79 are wound about spools 82 and 84 in the same direction such that armature portions 92 and 92 are magnetized with identical induced magnetic field orientations. The magnetic fields induced in armatures 92 and 94 interact with the biased magnetic field established in chamber 34 by permanent magnet members 60 and 62 and magnetic end caps 86 and 88. In the present discussion, armatures 92 and 94 are magnetized such that armature 92 is attracted toward end cap 86 while armature 94 is repelled from end cap 88. When valve member 90 reaches the desired position along axis 44 a feedback signal is generated on line 186, as will be described in more detail hereafter, and the application of current through coils 78 and 79 is terminated. To move valve member 90 in the opposite direction to that previously described, the current through coils 78 and 79 is reversed inducing a magnetic field in armatures 92 and 94 such that armature 92 is attracted toward end cap 88 while armature 94 is repelled away from end cap 86. Manual control signal generator 170 may be calibrated such that preselected magnitudes of DC current establish magnetic fields in armatures 92 and 94 of varying strengths thereby providing an infinite number of discrete positions of valve member 90 along axis 44. As previously mentioned, springs 110 and 128 function to bias valve member 90 in a predetermined neutral or null position. The predetermined neutral position can be adjusted utilizing screws 98 and 100 which are received within the ends of armature portions 92 and 94, respectively. After current through 78 is terminated, the induced magnetic field within armatures 92 and 94 may typically dissipate and springs 110 and 128 return valve member 90 to its neutral or null position. The feedback signal which causes the current in coil 78 to cease may be generated by permanent magnet 200 on rod 16 interacting with Hall effect generator 190.

The electronic control circuitry of the present invention will now be described with particular reference to FIGS. 8–10. Manually operable lever 180 is actuated and amplifier 176 generates an appropriate signal on line 178 to drive circuit 172. For the purpose of the discussion which follows, it is assumed that the initial signal on line 178 is a positive voltage which then appears at input 6 of power amplifier 182. With a positive input at 6, the output at 5 also is a positive signal. The positive output signal at 5 is sampled through resistor $R^{7}$ and applied to the negative input 8 of power amplifier 184. With a positive input at 8 the output at 10' of amplifier 184 goes negative. The current flow through coil 78 is therefore in a direction from output terminal 5 toward output terminal 10'. As permanent magnet 200 moves Hall effect generator 190 detects the unproportional magnetic field generated by the movement thereof and provides a differential output at terminals 1' and 8'. The positive signal at 1' is applied through resistor $R^{11}$ to positive input terminal 3*a* of integrator 192. The negative signal at output 8' supplied through resistor $R^{13}$ to negative input 2*a* of integrator 192. Integrator 192 produces a single ended output signal at terminal 6*a* which is applied over line 196 through resistor $R^{1}$ to negative input 7 of power amplifier 182. As long as there is a signal differential on inputs 6 and 7 of power amplifier 182, an output signal will be generated at terminal 5. When valve member 90 reaches a desired position the feedback signal on line 186 and the input signal on line 178 are equal and the output at terminals 5 and 10' of power amplifiers 182 and 184 goes to a predetermined equivalent value, i.e., $\frac{1}{2}$ VCC, through coil 78.

Upon termination of current flow through coil 78 valve member 90 returns to its null or steady-state position as previously described.

If the input signal on line 178 is negative, a negative output signal will appear at terminal 5. The negative output signal is again sampled by through resistor $R^7$ and applied to negative input terminal 8 of power amplifier 184. The application of negative input signal at terminal 8 generates a positive output signal at terminal 10′. Current through coils 78 and 79 is therefore reversed and flows generally in a direction from terminal 10′ toward terminal 5. When the signal differential on lines 178 and 186 is zero the signals at output terminals 5′ and 10′ are again returned to a predetermined equivalent value and current flow through coils 78 and 79 ceases.

Feedback resistor $R^3$ is selected to have a relatively high impedance such that the feedback signal on line 186 is not applied through resistor $R^7$ to negative input terminal 8 of power amplifier 184. Additionally, the values of resistors $R^4$ and $R^5$ are similarly selected such that the input signal on line 178 substantially does not appear at positive input 9 of power amplifier 184. Offset resistor $R^{14}$ in feedback circuit 174 is utilized to provide a null or steady-state output signal at terminal 6*a* which corresponds to the null output of manual signal generator 170. The null or steady-state output at terminals 5 and 10′ may, by appropriate design, be any selected constant voltage. In the preferred embodiment disclosed herein, the null voltage at outputs 5 and 10 is selected to be one-half of VCC.

In the present invention, the position of valve member 90 is directly proportional to the magnetic field generated by coils 78 and 79 and therefore to the current flowing within coils 78 and 79. Valve member 90 therefore has an infinite number of discrete positions along axis 44. In the embodiment wherein proportional control valve 10 is utilized in conjunction with a four-way valve 12, as described above valve member 90 returns to the null state shown in FIG. 2 when there is substantially no differential between the signals on lines 178 and 186, thereby terminating current flow through coil 78. It is contemplated that valve or force motor 10 has application independent of the above described embodiment wherein valve 10 serves as a pilot valve for valve 12. In these alternative applications of control valve 10 it may be desirable to hold the valve member 90 in a particular axial position along axis 44. As has been seen, valve member 90 tends to return to the null or steady-state position when current is removed from coils 78 and 79. Therefore, to hold valve member 90 in a position other than the steady-state it is necessary to maintain a predetermined desired current flow through coils 78 and 79. Such functional changes in proportional valve 10 can be achieved through minor modification of the circuitry controlling the current input into coils 78 and 79. Such circuit modification is considered to be within the knowledge of one having the ordinary skill in the art.

One embodiment of the present invention that has been found to be particularly effective is the embodiment wherein substantially the entire valve member 90 is formed of a magnetizable material of substantially low permeability. For clarity in connection with the following detailed explanation of the operation of this embodiment, reference is made to FIGS. 11–13 which illustrate schematically the magnetic fields established in the subject invention.

Figure 11:
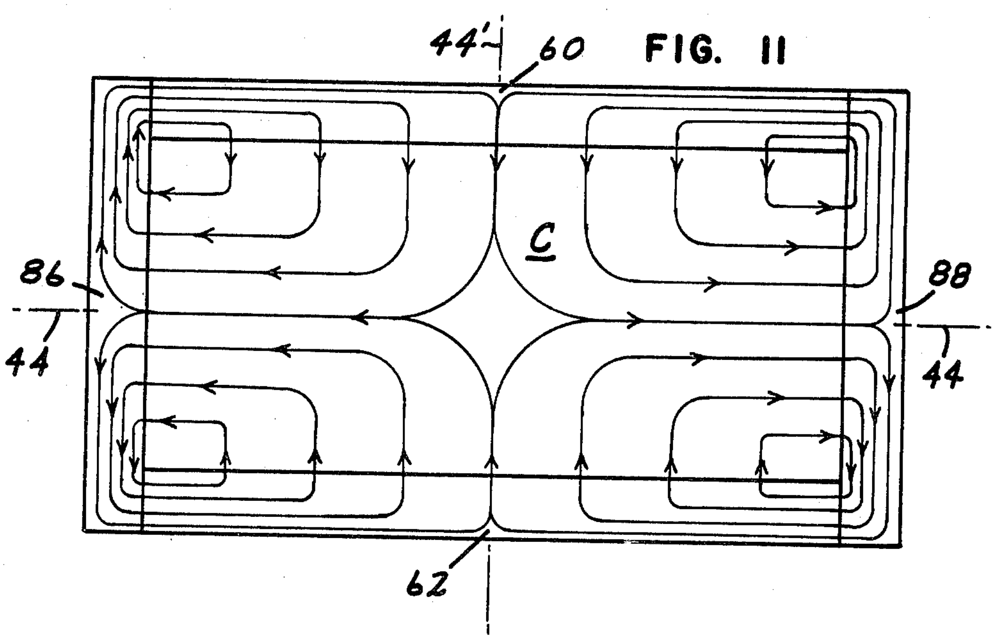
FIG. 11 is a schematic representation illustrating the radial magnetic field established within the valve body.

Specifically, as shown in FIG. 11, the semicylindrical permanent magnet members 60 and 62 and permanent magnet end caps 86 and 88 establish a static saturated permanent magnetic field within the valve body, illustrated for the sake of simplicity as a cavity C. The lines of magnetic force extend generally radially inward toward central axis 44, then axially toward end caps 86 and 88. The static permanent magnetic field established within cavity C is substantially symmetrical about a plane normal to the central axis 44 and positioned along axis 44 at the midpoint of cavity C. The line of magnetic symmetry is given the designation 44′. The magnetic symmetry within cavity C tends to cause material susceptible to magnetic force to maintain a central position at the midpoint of the cavity assuming the object of magnetic material is initially centered within the cavity C.

Figure 12:
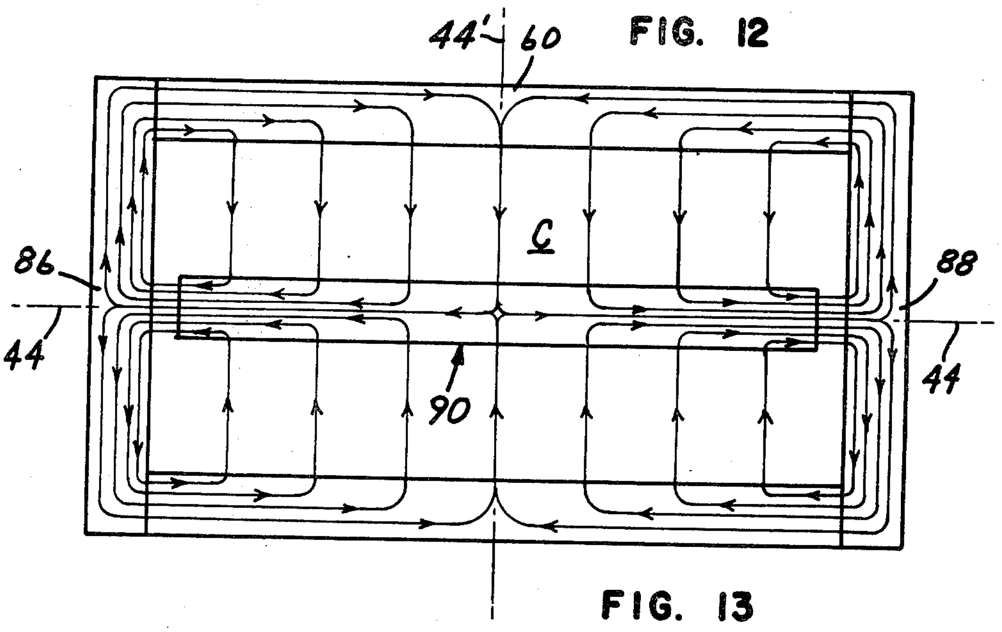
FIG. 12 is a schematic representation illustrating the effect of the valve member upon the radial magnetic field within the valve body.

FIG. 12 illustrates the effect of a valve member 90 which throughout substantially its entire length is formed of a magnetic material of relatively low permeability. Valve member 90 is of course aligned along central axis 44. Valve member 90 tends to concentrate the magnetic flux within cavity C. As shown the static permanent magnetic field within cavity C becomes more radially oriented as the flux lines extend inward from semicylindrical members 60 and 62 toward valve member 90.

Figure 13:
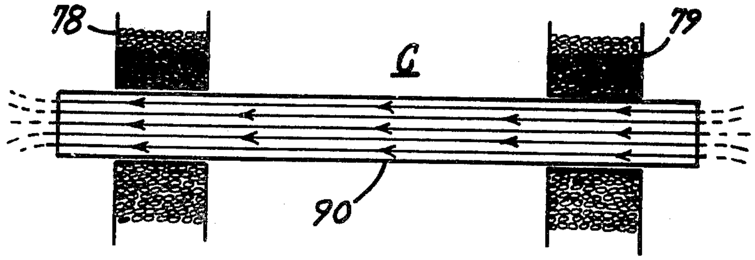
FIG. 13 is a schematic representation illustrating the axial magnetic field established within the valve member by the conductor coils.

In FIG. 13 the effect of current within coils 78 and 79 is illustrated. Specifically, an axial magnetic field is induced within valve member 90. It is understood that reversal of the direction of current flow will reverse the orientation of the axial magnetic field within valve member 90 from that shown in FIG. 13. The induced magnetic field is relatively small in comparison with the statis permanent magnetic field within cavity C and consequently the energization of the coils does not substantially alter the magnetic characteristics of the static field within cavity C and the field remains symmetrical. The axial magnetic field set up within valve member 90 interacts with the static magnetic field within cavity C and the resultant force acting upon valve member 90 positions valve member 90 axially along axis 44. The static permanent magnetic field within cavity C and the axial magnetic field induced within valve member 90 effectively work against each other in positioning valve member 90 axially along central axis 44. The symmetrical and uniform nature of the permanent magnetic field within cavity C ensures interaction of the permanent magnetic field with the magnetic field induced in the valve member 90 along the entire length of valve member 90. Thus elements of force acting upon valve member 90 are present along its entire length resulting in more effective control of the positioning of valve member 90 axially in response to current within coils 78 and 79.

From the above description, it can be seen that the present invention is a multiposition valve with a valve member which can be accurately positioned in essentially an infinite number of discrete positions to meet specific design requirements. The control valve has a particular application as a pilot valve for conventional four-way hydraulic valves. Such valves are used in significant number in hydraulic systems of industrial vehicles, such as material handling equipment, tractors, etc. When control valve 10 is incorporated into such systems as a pilot valve, the hydraulic controls are significantly improved. Proportional valve 12, of course, has independent utility apart from its use as a pilot valve. As such it is a valve which can be accurately positioned and held in a substantially infinite number of positions of control fluid flow therethrough in accordance with particular requirements. It should be understood that valve 10, while being disclosed herein with reference to hydraulic fluid application could also find utility as a control valve in pneumatic systems.

What is claimed is:

1. An electrically controlled valve comprising:

(a) a housing having a central elongation axis;

(b) first and second substantially semicylindrical magnetic members disposed about said axis of said housing and defining a substantially cylindrical chamber therebetween;

(c) a substantially cylindrical valve body mounted within said cylindrical chamber defined by said first and second magnetic members, said cylindrical valve body having a central axis aligned with said axis of said housing, said valve body having an axial passageway therethrough along said central axis and a plurality of inlet and outlet passageways extending generally radially outward with respect to said axial passageway and in fluid communication with said axial passageway;

(d) a valve member mounted for axial reciprocation in said axial passageway and having means for establishing fluid communication between selected ones of said inlet and said outlet passageways, said valve member having a magnetizable portion;

(e) conductive coil having a central axis and disposed within said housing with said central axis aligned with said central axis of said valve body with said valve member portion extending into said coil along its central axis; and (f) means for controlling the energization of said coil to induce a regulated magnetic field in said portion of said valve member, said magnetized portion of said valve member interacting with said first and second semicylindrical magnetic members to position said valve member along said central axis of said valve body.

2. A valve in accordance with claim 1 wherein said controlling means comprises electrical circuit means for regulating the magnitude and direction of direct current through said coil.

3. A valve in accordance with claim 1 wherein said means for establishing fluid communication between selected ones of said inlet and outlet passageways comprises a spool portion, said spool portion comprising a central portion of said valve member with said magnetizable portion disposed at one end of said spool portion.

4. A valve in accordance with claim 3 wherein said valve member comprises a second magnetizable portion disposed at the end of said spool portion opposite said first magnetizable portion.

5. A valve in accordance with claim 4 wherein said conductive coil comprises a first coil member mounted at one end of said cylindrical valve body and a second coil member mounted at the other end of said cylindrical valve body, said first and second magnetizable portions of said valve member extending into said first and second coil members, respectively.

6. A valve in accordance with claim 5 comprising spring means engaged with said valve body and said valve member biasing said valve member in a null position.

7. In combination with a piston actuated hydraulic valve having a piston actuator disposed within a chamber, the piston dividing the chamber into first and second chamber portions, the piston affixed to a piston rod extending from said valve, the valve having hydraulic fluid passageways opening into the first and second chamber portions, a pilot valve comprising:

(a) an elongated valve body having an elongation axis and an axial passageway therethrough aligned along said elongation axis; said valve body having an inlet passageway, at least one exhaust passageway, and first and second outlet passageways; said inlet, exhaust and outlet passageways in fluid communication with said axial passageway and each of said first and second outlet passageways in fluid communication with one of said fluid passageways of said hydraulic valve;

(b) means disposed about said valve body for establishing a biased magnetic field within said valve body and said axial passageway;

(c) a valve member mounted for axial reciprocation within said axial passageway to selectively establish fluid communication between said inlet, exhaust and first and second oulet passageways, said valve member having a first portion that is magnetizable when placed in a magnetic field and which loses its magnetization upon removal of said inducing magnetic field;

(d) electromagnetic means mounted to said valve body for inducing a magnetic field to magnetize said first portion of said valve member, said magnetized first portion interacting with said biased magnetic field to position said valve member along said axial passageway; and (e) control means for regulating the energization of said electromagnetic means to selectively position said valve member.

8. The combination in accordance with claim 7 wherein said control means comprises means for regulating the direction and magnitude of direct current applied to said electromagnetic means.

9. The combination in accordance with claim 8 comprising means for providing a feedback signal to said control means indicative of the position of said hydraulic valve.

10. The combination is accordance with claim 9 wherein said means for providing a feedback signal comprises:

(a) a permanent magnet affixed to the end of said rod that extends from said hydraulic valve; and (b) electric circuit means mounted to said hydraulic valve for detecting the position of said rod, said circuit means comprising a Hall effect generator disposed in close proximity to said permanent magnet affixed to said rod.

11. The combination in accordance with claim 7 wherein said valve body is substantially cylindrical with said axial passageway aligned along the central axis of said valve body and wherein said means for establishing a magnetic field comprises first and second substantially semicylindrical magnetic members disposed about said cylindrical valve body.

12. The combination in accordance with claim 11 wherein said valve member includes a central spool portion with said first magnetizable portion disposed at one end thereof and a second magnetizable portion disposed at the opposite end thereof, and wherein said electromagnetic means comprises a conductive coil having first and second coil portions mounted at opposite ends of said cylindrical valve body with said first and second magnetizable portions extending from said valve body into said first and second coil portions, respectively.

13. The combination in accordance with claim 12 comprising means for biasing said valve member in a null state with said first and second outlet passageways in fluid communication with said at least one fluid exhaust passageway.

14. The combination in accordance with claim 12 wherein said control means comprises electric circuit means for regulating the magnitude and direction of direct current applied to said coil to thereby regulate the magnitude of the magnetic field induced in said first and second magnetizable portions of said valve member.

15. The combination in accordance with claim 14 further comprising means for providing a feedback signal to said electric circuit means, said feedback signal indicative of the position of said hydraulic valve.

16. The combination in accordance with claim 15 wherein said means for providing a feedback signal further comprises:

(a) a permanent magnet affixed to said rod extending from the hydraulic valve; and (b) electric circuit means mounted to the valve for detecting the position of said rod, said electric circuit means comprising a Hall effect generator disposed in close proximity to said permanent magnet.

* * * * *